(12) United States Patent
Lin

(10) Patent No.: US 6,523,866 B2
(45) Date of Patent: Feb. 25, 2003

(54) CONSTANT TENSION CLAMPING DEVICE FOR FLANGED CONNECTIONS

(76) Inventor: Peter Lin, 345 Ivyland Rd., Warminster, PA (US) 18974

( * ) Notice: Subject to any disclaimer, the term of this patent is extended or adjusted under 35 U.S.C. 154(b) by 0 days.

(21) Appl. No.: 09/874,049

(22) Filed: Jun. 6, 2001

(65) Prior Publication Data

US 2002/0185869 A1 Dec. 12, 2002

(51) Int. Cl.$^7$ ................................................ F16L 23/00
(52) U.S. Cl. ..................... 285/410; 24/279; 411/383; 411/149; 411/396; 285/367; 285/411
(58) Field of Search ............... 24/279; 292/256.75; 285/409, 410, 411, 253, 367; 411/432, 533, 383, 396, 149, 150

(56) References Cited

U.S. PATENT DOCUMENTS

| | | | | |
|---|---|---|---|---|
| 2,659,953 A | * | 11/1953 | Woolsey ..................... 24/279 |
| 2,915,800 A | * | 12/1959 | Graef et al. ................. 24/279 |
| 3,157,932 A | * | 11/1964 | Kyrias ........................ 285/411 |
| 3,601,868 A | * | 8/1971 | Elsner ......................... 24/279 |
| 4,429,847 A | * | 2/1984 | Jablonski et al. ............. 24/279 |
| 4,739,542 A | * | 4/1988 | Krzesicki .................... 285/411 |
| 4,919,453 A | * | 4/1990 | Halling et al. .............. 285/411 |
| 5,522,625 A | * | 6/1996 | Flick et al. ................. 285/409 |
| 5,653,481 A | * | 8/1997 | Alderman .................... 285/363 |
| 5,873,611 A | * | 2/1999 | Munley et al. ............. 285/410 |

* cited by examiner

*Primary Examiner*—Eric K. Nicholson
(74) *Attorney, Agent, or Firm*—LaMorte & Associates

(57) ABSTRACT

A clamp device that is used to maintain a consistent clamping pressure on a flanged connection despite changes in temperature and changes in internal pressure behind the flanged connection. The clamp device contains a rocking bolt assembly that is manually tightened with a wing nut. Should the wing nut loosen, the rocking bolt assembly contains internal springs that compensate for the loosened wing nut and maintain a relatively consistent tension in the rocking bolt assembly within a predefined range of conditions.

18 Claims, 3 Drawing Sheets

CONSTANT TENSION CLAMPING DEVICE FOR FLANGED CONNECTIONS

BACKGROUND OF THE INVENTION

1. Field of the Invention

The present invention relates to clamping devices, commonly known as pipe clamps that are used to join together the flanged ends of two objects so that a fluid impervious seal is created between the opposing flanges. More particularly, the present invention relates to such clamping devices that are designed to provide a clamping tension that varies with changing conditions.

2. Description of the Prior Art

In the manufacture and processing of pharmaceutical products, dairy products and other materials that require a sanitary processing environment, it is common for materials to be stored and transported in stainless steel containers. Such stainless steel containers are manufactured by Eagle Stainless Container, Inc, of Ivyland Pa. The use of stainless steel is preferred because it enables the containers to be cleaned and sanitized in an autoclave or other harsh washing environment after they have been used. The stainless steel containers can therefore repeatedly be made sterile and can be used over and over again.

Since stainless steel containers are often used to house sterile materials or bioreactive materials, such containers typically do not contain threaded closures. Threaded closures provide confined areas between threads that may harbor contaminants or bioreactive material. Due to the physical shape of the threads, it is very difficult to properly clean threads to the sanitary standards needed. It is for this reason that threaded closures are generally not used. Rather, what is used are flanged caps.

Many stainless steel containers are manufactured with access ports that terminate with a flange connection. The flanged connection is a circular flange that radially extends from the neck of the access port. The access port can therefore be connected to a pipe with a similar flange connection or a cap that contains the proper sized flange connection. To join any two flanged connections together, the two flanges are placed in abutment so that the openings in the center of each of the flanges align. An O-ring or other sealer is placed between the two flanges. The flanges are then clamped together in a manner that compresses the O-ring and prevents the flanges from falling out of alignment.

In the prior art, there are many different types of clamping mechanisms that have been used to join together flanged connections. Typically, the clamps that have been used are annular in shape. Hinges are disposed along the annular structure to enable the annular structure to open. The clamps are opened and then closed over the span of the two adjoining flanges. The presence of the clamping device biases the adjoining flanges together and prevents the adjoining flanges from moving out of their aligned positions.

Prior art clamping devices with a single hinge are exemplified by U.S. Pat. No. 5,018,768 to Palatchy, entitled Pipe Coupling Hinge. Prior art clamping devices with multiple hinges are exemplified by U.S. Pat. No. 4,568,115 to Zimmerly, entitled Multi-Piece Pipe Clamp. Regardless of the number of hinges present, such prior art clamping devices typically contain a rocking bolt assembly that is pivotably connected to one end of the clamp. A wing nut is used to tighten the rocking bolt assembly. The wing nut passes over a slot that is positioned on the opposite end of the clamp. By tightening the wing nut, the diameter of the clamp can be reduced and the clamp can be tightened over the flanged connections.

In many applications, containers undergo severe temperature changes. For instance, a container may be filled at room temperature and then placed in a cryogenic environment, or vise versa. As the temperature of a container changes, the vapor pressure within the container changes and the forces on the cap of the container change. Additionally, as the container is moved into environments of differing temperatures, the temperature of the clamp used to hold a cap onto the container also changes. As a clamp experiences temperature changes, the metal of the clamp either expands or contracts. As such, a clamp that is very tight in one environment may become very loose in a different environment.

A need therefore exists for a new clamp design that is capable of providing a steady clamping pressure regardless of severe changes in temperature. This need is met by the present invention as it is described and claimed below.

SUMMARY OF THE INVENTION

The present invention is a clamping device that is used to maintain a consistent clamping pressure on a flanged connection despite changes in temperature and changes in internal pressure behind the flanged connection. The clamping device contains a plurality of arcuate segments. The first and the last of the arcuate segments contain base protrusions that align when the clamping device is closed. One of the base protrusions serves as the housing for a rocking bolt assembly. The rocking bolt assembly includes a threaded rod that joins to a shaft by a pivot. The threaded rod and shaft extend through a hole in the base protrusion. The shaft has an enlarged head that prevents the shaft and the threaded rod from passing through the hole. A wing nut engages the threaded rod and applies tension to both the threaded rod and the shaft. The amount of tension applied by the wing nut varies with changes in temperature. To compensate for variations in wing nut tension, at least one spring is provided around the shaft within the hole of the base protrusion. The spring, or springs, is compressed by the tension applied by the wing nut. When compressed, the spring, or springs, also applies tension to the shaft. The tension applied by the spring, or springs, compensates for any reduction in wing nut tension caused by a change in temperature.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE INVENTION

Although the present invention clamping device can be used to connect any two objects have the same type of flanged connection, such as two pipes, the present invention is especially well suited for connecting a cap to a container. However, the present invention clamp can be applied to any application of flanged connectors that requires a clamp.

Figure 1:
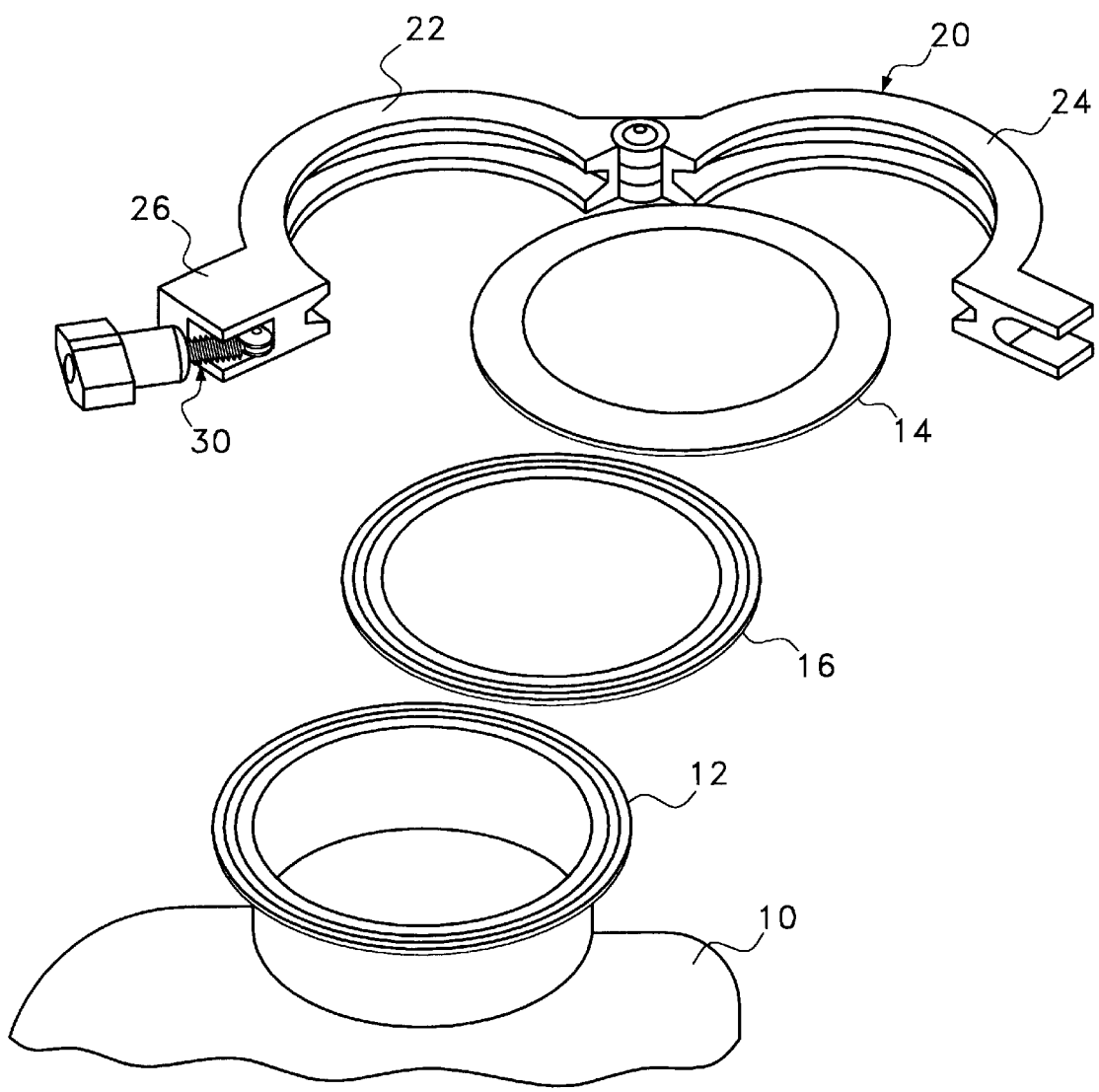
FIG. 1 is an exploded perspective view of a container having a flanged access port that is sealed with a cap, wherein the cap is held in place with an exemplary embodiment of a clamping device.

Referring to FIG. 1, there is shown a typical prior art container 10 with a flanged connection 12. The container 10 is shown with a cap 14 that is used to selectively close the opening defined by the flanged connection 12. The flanged connection 12 and the cap 14 both have corresponding sized surfaces that align when joined. An O-ring 16 is disposed between the flanged connection 12 and the cap 14. The O-ring creates a seal between the flanged connection 12 and the cap 14 when it is compressed.

The present invention is a clamping device 20 that extends around the flanged connection 12 and the cap 14, thereby biasing these two structures together and compressing the O-ring 16.

From FIG. 1, it can be seen that the clamping device 20 contains at least two arcuate segments 22, 24. The arcuate segments 22, 24 are joined together, thereby forming a structure that can be configured into a generally annular shape. The first arcuate segment 22 terminates with a base protrusion 26 that radially extends away from the center of curvature for the arcuate segment 22. However, a unique rocking bolt assembly 30 is contained within the base protrusion 26. The purpose of the rocking bolt assembly 30 is to retain the clamping device in a closed condition and apply a steady clamping force to the arcuate segments 22, 24 of the clamping device 20, across a wide range of environmental conditions.

Figure 2:
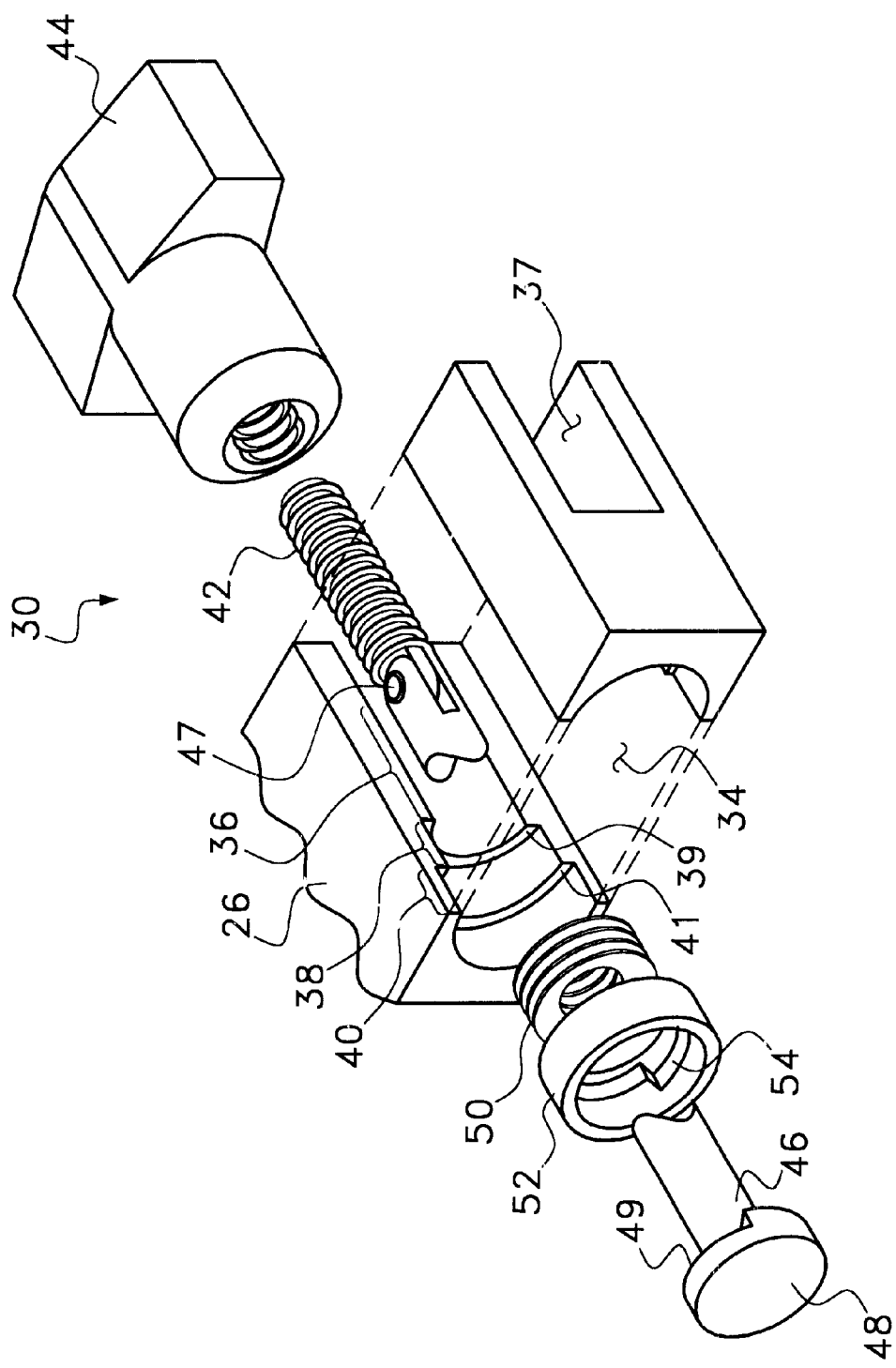
FIG. 2 is a fragmented, exploded view of the rocking bolt assembly used in the clamping device shown in FIG. 1.

Referring to FIG. 2, it can be seen that the base protrusion 26 of the clamping device 20 defines a hole 34 in which the rocking bolt assembly 30 lay. The hole 34 is not uniform, but rather contains three different sections. Each of the sections has a different diameter. The first section 36 has the smallest diameter. The first section 36 is intersected by a slot 37 that extends from the first section 36 of the hole 34 to the side of the base protrusion 26. The second section 38 of the hole 34 has a diameter larger than that of the first section 36 and is located next to the first section 36. This causes a first ridge 39 at the interface between the first section 36 and the second section 38. The third section 40 has a diameter larger than that of the second section 38 and is located next to the second section 38. This causes a second ridge 41 at the interface between the second section 38 and the third section 40.

The elements of the rocking bolt assembly 30 that extend through the hole 34 in the base protrusion 26, are as follows.

A threaded rod 42 is provided. The threaded rod 42 has an eyelet at one end. The threaded rod 42 has a diameter small enough to pass through both the first section 36 of the hole 34 and the slot 37 on the side of the base protrusion 26. The threaded rod 42 is engaged by a wing nut 44 that is used to tighten the rocking bolt assembly 30.

The eyelet at the end of the threaded rod 42 is connected to the end of a smooth shaft 46 with a pivot 47. As a result, the threaded rod 42 can be moved about the pivot 47 relative to the smooth shaft 46. The end of the smooth shaft 46, opposite the threaded rod 42, terminates with an enlarged head 48. The enlarged head 48 may have a cammed inner surface 49, as will later be explained.

At least one disc spring 50 is placed around the smooth shaft 46. A disc spring 50 is a spring where the center of the spring lay in a different plane from the periphery of the spring. Although a coil spring can be used, the use of disc springs are preferred. This is because disc springs generally have a higher spring constant per unit of space than do coil springs. Furthermore, due to their compact structure, disc springs are less sensitive to temperature changes than are coil springs.

The disc springs 50 lie around the smooth shaft 46 in the second section 38 of the hole 34. The combined thickness of the disc springs 50 is larger than the width of the second section 38, when the disc springs are uncompressed. As a result, the disc springs 50 must be slightly compressed in order to be contained completely within the second section 38 of the hole 34. The disc springs 50 are confined within the second section 38 of the hole by the first transition ridge 39 and a cam housing 52. The first transition ridge 39 between the first section 36 and the second section 38 of the hole 34 abuts against the first of the disc springs 50 and prevents the disc springs 50 from advancing into the first section 36 of the hole 34. On the opposite side of the discs springs 50, a cam housing 52 is placed around the smooth shaft 46. The cam housing 52 has a diameter that fits into the third section 40 of the hole 34 but is too large to fit into the second section 38 of the hole 34. As such, the cam housing 52 cannot be advanced into the hole 34 beyond the second transition ridge 41 between the second section 38 of the hole 34 and the third section 40 of the hole 34.

The cam housing 52 has an internal cammed surface 54 that faces away from the disc springs 50. The internal cammed surface 54 of the cam housing 52 engages the cammed surface 49 of the enlarged head 48 at the end of the smooth shaft 46.

When the wing nut 44 is tightened, the wing nut 44 applies a tension force to the threaded rod 42. The threaded rod 42 transfers that tension force to the smooth shaft 46. The tension force biases the enlarged head 48 of the smooth shaft 46 toward the hole 34 in the base protrusion 26 of the clamp assembly. As the enlarged head 48 of smooth shaft 46 advances toward the hole 34, the cammed surface 49 on the enlarged head 48 meshes with the cammed surface 54 within the cam housing 52. The tension force in the smooth shaft 46 is then transferred as a compression force to the cam housing 52. The cam housing 52 itself is then biased into the third section 40 of the hole 34 by the compression force. As the cam housing 52 is biased into the third section 40 of the hole 34, the cam housing 52 pushes the disc springs 50 into the second section 38 of the hole 34. If the compression force surpasses the spring coefficient of the disc springs 50, the disc springs 50 compress until the cam housing 52 abuts against the second transition ridge 41.

If the wing nut 44 is over rotated., the tension force applied to the smooth shaft 46 may surpass a predetermined maximum threshold value. The cammed surface 49 on the enlarged head 48 and the cammed surface 54 in the cam housing 52 are designed to engage each other until the maximum threshold value is reached. If a tension force is experienced that surpasses the maximum threshold value, the cammed surface 49 on the enlarged head 48 and the cammed surface 54 in the cam housing 52 slip passed each other. As such, the smooth shaft 46 is free to spin with the threaded rod 42 and the wing nut 44, thereby making further tightening impossible.

Figure 3:
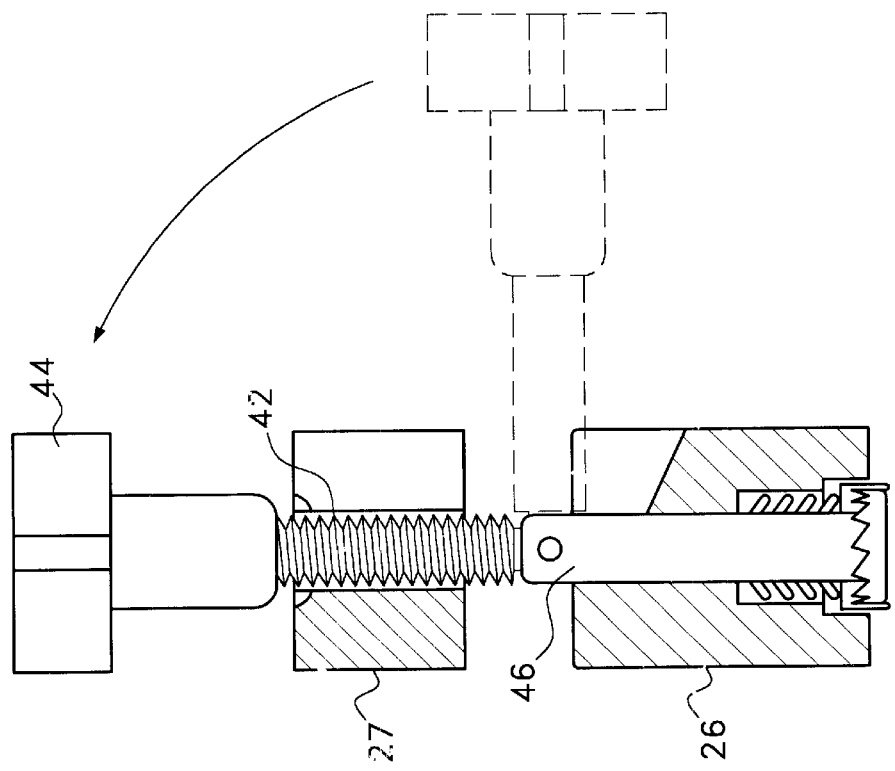
FIG. 3 is a selectively cross-sectioned view of the rocking bolt assembly shown in FIG. 1, illustrated in an open condition.

Referring to FIG. 3, it can be seen that to use the clamp assembly, both base protrusions 26, 27 of the clamp assembly are aligned. The wing nut 44 is then rotated so that the threaded rod 42 and the smooth shaft 46 linearly align. Once aligned, the wing nut 44 is tightened so that the wing nut 44 biases the two base protrusions 26, 27 of the clamp assembly toward each other.

Figure 4:
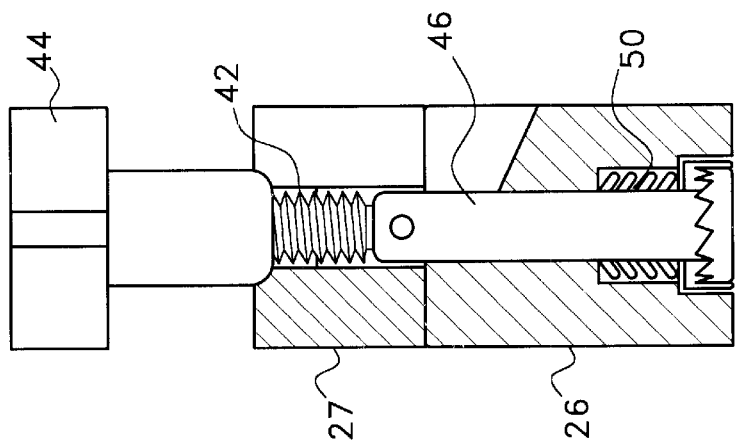
FIG. 4 is a selectively cross-sectioned view of the rocking bolt assembly shown in FIG. 1, illustrated in a closed condition.

Referring now to FIG. 4, it can be seen that when the wing nut 44 is fully tightened, the disc springs 50 become compressed. There are now two elements that are applying tension to the threaded rod 42 and the smooth shaft 46. The first element is the wing nut 44 as it abuts against the base protrusion 27 of the clamp assembly. The second element is the disc springs 50. The disc springs 50 apply tension to the smooth shaft 46 throughout their range of compression. Accordingly, should the wing nut 44 become loose, the tension in the smooth shaft 46 would remain constant because the disc springs 50 would partially decompress to compensate for the loosening wing nut 44. If the disc springs 50 were compressed a total of ¼ inch, then the wing nut 44 can be retracted ¼ inch without effecting the tension in the smooth shaft 46 and thus the clamping strength of the assembly.

Furthermore, should the force applied to the clamp by the wing nut 44 become greater due to changes in temperature, the excess tension force can be absorbed by further compressing the disc springs 50 and the tension applied to the clamp assembly remains relatively constant.

The clamping device therefore provides a means to maintain a relatively constant clamping pressure on a flanged opening throughout a wide range of changing temperatures and internal vessel pressures. The result is a more reliable and versatile clamp that creates a more reliable and versatile seal.

In the described embodiments, a cam housing was used to prevent the wing nut from being over tightened. This feature is optional. All components in the clamp assembly are preferably made of stainless steel. Accordingly, it is unlikely that enough force can be applied by hand to damage the clamp assembly. The described cam housing can simply be replaced with a flat washer if desired. Similarly, the cammed surface on the enlarged head of the smooth shaft can also be eliminated.

It will be understood that the various figures described above illustrate only one preferred embodiment of the present invention. A person skilled in the art can therefore make numerous alterations and modifications to the shown embodiment utilizing functionally equivalent components to those shown and described. For example, there are numerous types of spring elements and spring configurations that can be substituted for the disc springs described. All such modifications are intended to be included within the scope of the present invention as defined by the appended claims.

What is claimed is:

1. A clamp device for a flanged connection, comprising:
   a plurality of arcuate segments containing a first arcuate segment and a last arcuate segment, wherein said first arcuate segment has a first base protrusion extending therefrom and said last arcuate segment has a second base protrusion extending therefrom;
   a rocking bolt assembly coupled to said first base protrusion, said rocking bolt assembly including,
   a threaded rod;
   a shaft having a first end and a second end, wherein said first end of said shaft terminates with an enlarged head and said second end of said shaft is coupled to said threaded rod with at a pivot;
   a nut for engaging said threaded rod;
   at least one spring disposed between said first end of said shaft and said first base protrusion for applying a predetermined tension force to said shaft, when said at least one spring is compressed.

2. The device according to claim 1, wherein said at least one spring is at least one annular disc spring.

3. The device according to claim 1, further including a mechanism for preventing said nut from being overtightened on said threaded rod.

4. The device according to claim 1, wherein a hole is formed through said first base protrusion and said shaft and said threaded rod extends through said hole.

5. The device according to claim 4, wherein said at least one spring is disposed in said hole around said shaft.

6. The device according to claim 4, wherein a slot intersects said hole in said first base protrusion, wherein said threaded rod can be selectively rotated into said slot about said pivot.

7. The device according to claim 4, wherein said hole has different diameters in different sections, creating ridges on the interior of said hole.

8. The device according to claim 7, wherein said at least one spring is compressed between said enlarged head of said shaft and one of said ridges when said nut is tightened on said threaded rod to a predetermined tension.

9. A rocking bolt assembly for use in tightening a clamp, comprising:
   a housing coupled to the clamp, said housing defining a hole;
   a shaft having a first end and a second end, said first end terminating with a head, wherein said head is sized too large to completely pass through said hole;
   a threaded rod coupled to said second end of said shaft with a pivot;
   a nut for engaging said threaded shaft outside said hole;
   at least one spring element disposed in said hole for applying a predetermined tension to said shaft when compressed.

10. The assembly according to claim 9, wherein said at least one spring becomes compressed when said nut is tightened on said threaded rod.

11. The assembly according to claim 9, wherein said at least one spring is at least one annular disc spring.

12. The assembly according to claim 9, further including a mechanism for preventing said nut from being overtightened on said threaded rod.

13. The assembly according to claim 9, wherein said at least one spring is disposed in said hole around said shaft.

14. The assembly according to claim 9, wherein a slot intersects said hole and said threaded rod can be selectively rotated into said slot about said pivot.

15. The assembly according to claim 9, wherein said hole has different diameters in different sections, creating ridges on the interior of said hole.

16. The assembly according to claim 15, wherein said at least one spring is compressed between said head of said shaft and one of said ridges when said nut is tightened on said threaded rod to said predetermined tension.

17. A clamp device, comprising:
   a plurality of arcuate segments, wherein each of said arcuate segments has two ends;
   a pivot coupling at least one end of each arcuate segment to another of said arcuate segments, thereby producing a chain of said arcuate segments that extend from a first end to a second end said chain of arcuate segments being configurable into an annular structure when said first end is brought into abutment with said second end, wherein a hole is disposed in said first end of said chain of arcuate segments ; and
   a rocking bolt assembly coupled to said first end, said rocking bolt assembly having a threaded shaft that extends through said hole in said first end of said chain of arcuate segments,
      a nut capable of engaging said threaded shaft and biasing said first end in abutment with said second end, and
      a plurality of disc springs, disposed in said hole, that are compressed when said nut applies a predetermined tension to said threaded shaft.

18. The assembly according to claim 17, further including a mechanism for preventing said nut from being over tightened on said threaded rod.

* * * * *